(12) United States Patent
Lewis et al.

(10) Patent No.: US 11,081,099 B2
(45) Date of Patent: *Aug. 3, 2021

(54) AUTOMATED SPEECH PRONUNCIATION ATTRIBUTION

(71) Applicant: Google LLC, Mountain View, CA (US)

(72) Inventors: Justin Lewis, South San Francisco, CA (US); Lisa Takehana, San Bruno, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,942

(22) Filed: Dec. 20, 2019

(65) Prior Publication Data

US 2020/0243063 A1 Jul. 30, 2020

Related U.S. Application Data

(63) Continuation of application No. 15/995,380, filed on Jun. 1, 2018, now Pat. No. 10,559,296, which is a
(Continued)

(51) Int. Cl.
*G10L 15/22* (2006.01)
*G10L 13/02* (2013.01)
(Continued)

(52) U.S. Cl.
CPC .............. *G10L 13/02* (2013.01); *G06F 3/167* (2013.01); *G10L 13/00* (2013.01); *G10L 15/02* (2013.01);
(Continued)

(58) Field of Classification Search
CPC ......... G10L 13/02; G10L 13/00; G10L 15/02; G10L 15/22; G10L 25/51; G06F 3/167; H04L 67/18; H04L 67/24; H04L 67/306
(Continued)

(56) References Cited

U.S. PATENT DOCUMENTS 5,029,200 A 7/1991 Hass et al.
5,679,001 A 10/1997 Russell et al.
(Continued)

FOREIGN PATENT DOCUMENTS

CN 101266600 9/2008
CN 101441869 5/2009
(Continued)

OTHER PUBLICATIONS

China National Intellectual Property Administration; Notification of Second Office Action issue in Application No. 201910505084.7; 7 pages; dated Aug. 18, 2020.
(Continued)

*Primary Examiner* — Abul K Azad
(74) *Attorney, Agent, or Firm* — Middleton Reutlinger (57) ABSTRACT

Methods, systems, and apparatus for determining candidate user profiles as being associated with a shared device, and identifying, from the candidate user profiles, candidate pronunciation attributes associated with at least one of the candidate user profiles determined to be associated with the shared device. The methods, systems, and apparatus are also for receiving, at the shared device, a spoken utterance; determining a received pronunciation attribute based on received audio data corresponding to the spoken utterance; comparing the received pronunciation attribute to at least one of the candidate pronunciation attributes; and selecting a particular pronunciation attribute from the candidate pronunciation attributes based on a result of the comparison of the received pronunciation attribute to at least one of the candidate pronunciation attributes. With the methods, systems, and apparatus, the particular pronunciation attribute, selected from the candidate pronunciation attributes, is provided for outputting audio associated with the spoken utterance.

18 Claims, 4 Drawing Sheets

Related U.S. Application Data continuation of application No. 15/394,104, filed on Dec. 29, 2016, now Pat. No. 10,013,971.

(51) Int. Cl.
*G10L 13/00* (2006.01)
*G06F 3/16* (2006.01)
*G10L 15/02* (2006.01)
*G10L 25/51* (2013.01)
*H04L 29/08* (2006.01)

(52) U.S. Cl.
CPC .............. *G10L 15/22* (2013.01); *G10L 25/51* (2013.01); *H04L 67/18* (2013.01); *H04L 67/24* (2013.01); *H04L 67/306* (2013.01)

(58) Field of Classification Search
USPC ...................................................... 704/270.1
See application file for complete search history.

(56) References Cited

U.S. PATENT DOCUMENTS

| | | | |
|---|---|---|---|
| 5,897,616 A * | 4/1999 | Kanevsky | G10L 17/24 |
| | | | 379/88.02 |
| 6,055,498 A | 4/2000 | Neumeyer et al. | |
| 6,078,885 A | 6/2000 | Beutnagel | |
| 6,125,206 A | 9/2000 | Yokota et al. | |
| 6,985,865 B1 | 1/2006 | Packingham et al. | |
| 7,027,832 B2 | 4/2006 | Gum | |
| 7,266,495 B1 | 9/2007 | Beaufays et al. | |
| 7,283,964 B1 | 10/2007 | Geilhufe | |
| 7,593,849 B2 | 9/2009 | Das | |
| 8,032,383 B1 * | 10/2011 | Bhardwaj | G10L 15/30 |
| | | | 704/275 |
| 8,255,223 B2 | 8/2012 | Wang | |
| 8,719,202 B1 | 5/2014 | Maeng | |
| 8,827,712 B2 | 9/2014 | Mack | |
| 8,886,545 B2 | 11/2014 | Meisel et al. | |
| 9,263,032 B2 | 2/2016 | Meruva | |
| 9,460,088 B1 | 10/2016 | Sak et al. | |
| 10,013,971 B1 * | 7/2018 | Lewis | H04L 67/18 |
| 10,366,158 B2 | 7/2019 | Bellegarda et al. | |
| 10,559,296 B2 * | 2/2020 | Lewis | G10L 13/02 |
| 2001/0039492 A1 | 11/2001 | Nemoto | |
| 2002/0173966 A1 | 11/2002 | Renton | |
| 2003/0050779 A1 | 3/2003 | Riis | |
| 2004/0193420 A1 | 9/2004 | Kennewick | |
| 2006/0004572 A1 | 1/2006 | Ju | |
| 2008/0154611 A1 | 6/2008 | Evermann et al. | |
| 2009/0067756 A1 | 3/2009 | Meyer | |
| 2010/0057457 A1 | 3/2010 | Ogata et al. | |
| 2011/0093261 A1 | 4/2011 | Angott | |
| 2011/0307241 A1 | 12/2011 | Waibel | |
| 2012/0232904 A1 | 9/2012 | Zhu et al. | |
| 2012/0253817 A1 | 10/2012 | Trinh | |
| 2013/0030804 A1 | 1/2013 | Zavaliagkos et al. | |
| 2013/0110511 A1 | 5/2013 | Spiegel et al. | |
| 2014/0032216 A1 | 1/2014 | Roth et al. | |
| 2014/0292639 A1 | 10/2014 | Kamhi et al. | |
| 2015/0019228 A1 | 1/2015 | Akolkar et al. | |
| 2015/0032455 A1 | 1/2015 | Gazdzinski | |
| 2015/0081293 A1 | 3/2015 | Hsu et al. | |
| 2015/0106082 A1 | 4/2015 | Ge et al. | |
| 2015/0243278 A1 | 8/2015 | Kibre et al. | |
| 2016/0307569 A1 | 10/2016 | Peng et al. | |

FOREIGN PATENT DOCUMENTS

| | | |
|---|---|---|
| CN | 103442290 | 12/2013 |
| JP | 2007511399 | 5/2007 |
| JP | 2016122183 | 7/2016 |
| WO | 2013066409 | 5/2013 |
| WO | 2016167992 | 10/2016 |
| WO | 2017213682 | 12/2017 |
| WO | 2018045011 | 3/2018 |

OTHER PUBLICATIONS

Japanese Patent Office; Notice of Reasons for Rejection issue in JP Application No. 2019-535755; 4 pages; dated Sep. 7, 2020.
China National Intellectual Property Administration, Notification of First Office Action issue in Application No. 201910505084.7; dated Mar. 3, 2020.
International Preliminary Report on Patentability issued in International Application No. PCT/US2017/042788, 15 pages; dated May 7, 2018.
International Search Report and Written Opinion in International Application No. PCT/US2016/063316; 14 pages; dated Feb. 21, 2017.
International Search Report and Written Opinion issued in International Application No. PCT/US2017/042788; 15 pages; dated Nov. 7, 2017.
Office Action issued in British Application No. GB1715809.8, 9 pages; dated Mar. 26, 2018.
Rao et al., "Automatic Pronunciation Verification for Speech Recognition," ICASSP 2015; 5 pages; dated Apr. 24, 2015.
Office action issued in Chinese Application No. 201710915606.1, 9 pages; dated Feb. 19, 2019.
Office Action issued in Chinese Application No. 201710915606.1; 14 pages; dated Nov. 8, 2018.
Intellectual Property of India; Notice of Office Action issue in Application No. 201927023372; 6 pages; dated Dec. 1, 2020.
The Korean Intellectual Property Office; Notice of Office Action issue in Application No. 10-2019-7021660; 11 pages; dated Nov. 20, 2020.
China National Intellectual Property Administration; Notification of Notice of Allowance issue in Application No. 201910505084.7; 4 pages; dated Nov. 18, 2020.
Japanese Patent Office; Notice of Allowance issue in JP Application No. 2019-535755; 3 pages; dated Dec. 7, 2020.
The Korean Intellectual Property Office; Notice of Allowance issue in Application No. 10-2019-7021660; 3 pages; dated Apr. 30, 2021.

* cited by examiner

AUTOMATED SPEECH PRONUNCIATION ATTRIBUTION

CROSS REFERENCE TO RELATED APPLICATION

This application is a continuation of U.S. application Ser. No. 15/995,380, filed Jun. 1, 2018, which is a continuation of U.S. application Ser. No. 15/394,104, filed Dec. 29, 2016. The contents of each are incorporated herein by reference.

FIELD

The present specification generally relates to speech recognition.

BACKGROUND

Certain computing devices have speech recognition functionality, e.g., voice-activated devices, and may provide appropriate responses to a user's utterance. Certain of these computing devices with speech recognition functionality are shared devices that have multiple users interacting with the shared device. In addition, a particular user may interact with several different devices that have speech recognition functionality. In each of these instances, the computing device with speech recognition functionality can have difficulty identifying the particular user that is currently interacting with the computing device. Accordingly, the user's interaction with the computing device often yields undesirable results.

SUMMARY

The present disclosure allows users to be accurately associated with spoken utterances received at a device. The present disclosure also allows the device to respond to the receipt of a spoken utterance by performing an appropriate action, such as providing an appropriate audio response. As a result, a user's account or information can be linked across multiple devices and creates a unified user experience across all devices with which the user interacts. That same unified user experience is also provided for each user interacting with a shared device.

One innovative aspect of the subject matter described in this specification is embodied in methods that include the actions of determining candidate user profiles as being associated with a shared device; identifying, from the candidate user profiles, candidate pronunciation attributes associated with at least one of the candidate user profiles determined to be associated with the shared device; receiving, at the shared device, a spoken utterance; determining a received pronunciation attribute based on received audio data corresponding to the spoken utterance; comparing the received pronunciation attribute to at least one of the candidate pronunciation attributes; selecting a particular pronunciation attribute from the candidate pronunciation attributes based on a result of the comparison of the received pronunciation attribute to at least one of the candidate pronunciation attributes; and providing the particular pronunciation attribute, selected from the candidate pronunciation attributes, for outputting audio associated with the spoken utterance.

These and other implementations may each optionally include one or more of the following features. For instance, determining candidate user profiles as being associated with a shared device may include determining a relationship between each of a plurality of user profiles and the shared device; determining, for each user profile, whether the relationship is indicative of an association between the user profile and the shared device; and identifying, for each user profile having a relationship indicative of an association with the shared device, the user profile as being one of the candidate user profiles associated with the shared device.

According to another aspect of the subject matter described in this specification, for each of the plurality of user profiles, the relationship comprises a record of whether the user profile has been logged-in to the shared device or whether at least one user device associated with the user profile has communicated with the shared device.

According to another aspect of the subject matter described in this specification, for each of the plurality of user profiles, the relationship comprises a geographical proximity of at least one user device associated with the user profile to the shared device.

According to yet another aspect of the subject matter described in this specification, for each of the plurality of user profiles, the relationship comprises a social connectivity, the social connectivity being based on at least one social connectivity metric.

Another aspect of the subject matter described in this specification is embodied in methods that include the actions of providing an audio response to the spoken utterance, the audio response comprising the particular pronunciation selected from the candidate pronunciation attributes.

In certain implementations, each user profile of the candidate user profiles comprises one or more pronunciation attributes associated with a canonical identifier, the canonical identifier representing a particular pronunciation.

Other implementations of these aspects include corresponding systems, apparatus, and computer programs, configured to perform the actions of the methods, encoded on computer storage devices.

Implementations of the present disclosure provide several technical advantages, some of which are described in more detail below. For example, speech recognition and pronunciation of a particular name, keyword, or phrase is often computationally expensive, and implementations of the present disclosure decrease the computational load associated with identifying the user, performing speech recognition, and provide the correct pronunciation in an audio output. As another example, the streamlining of the process provided by the present disclosure produces the technical advantages of reducing the required bandwidth and providing battery power savings. As yet another example, the present disclosure provides the technical advantage of increasing transcription accuracy in speech recognition by, for example, reducing the number of candidate names, words, or phrases.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
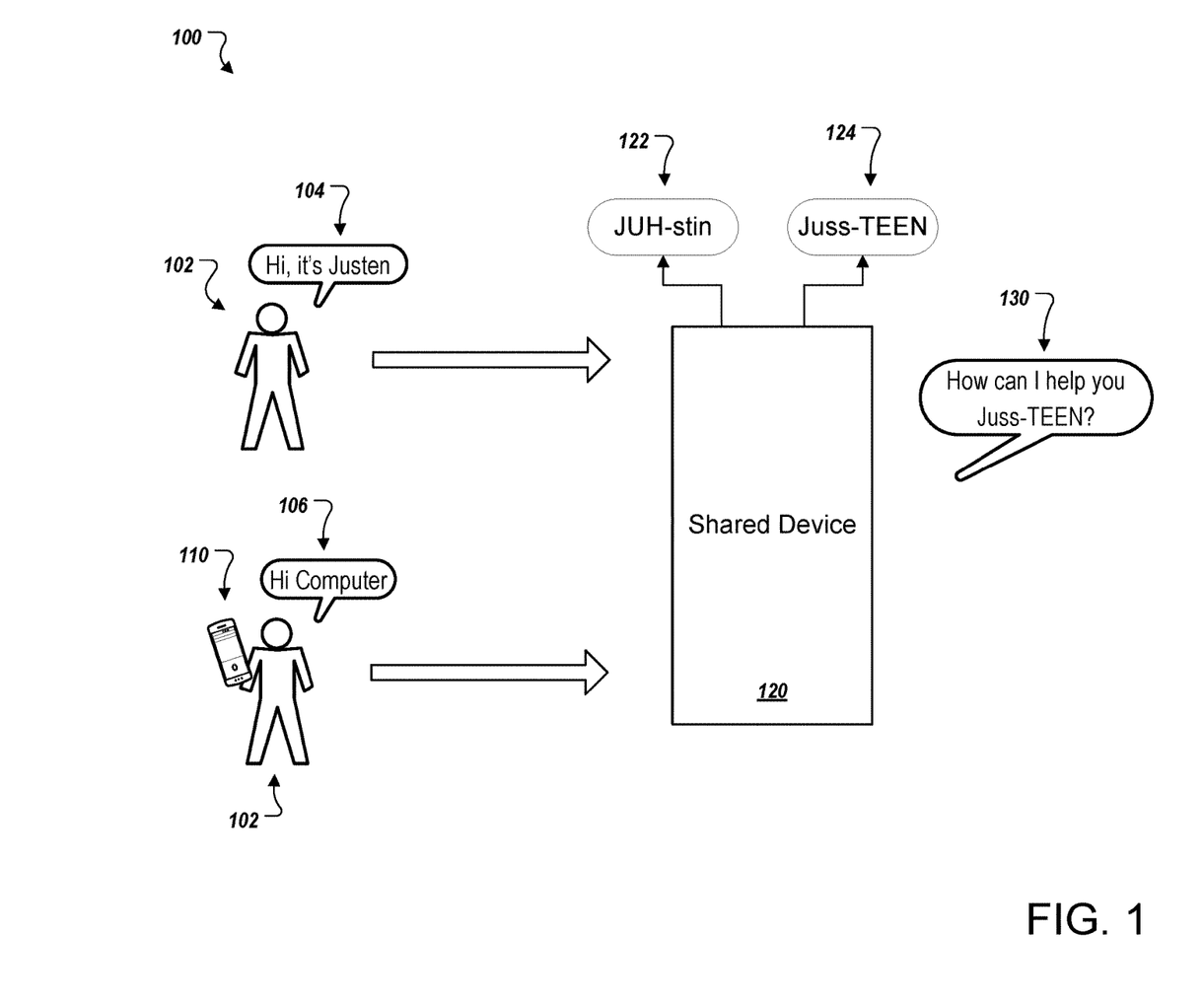
FIG. 1 depicts an example diagram for operation of a speech pronunciation attribution system, according to certain implementations.

FIG. 1 depicts an example diagram 100 for operation of a speech pronunciation attribution system. A user 102 may speak an utterance 104/106. The user 102 may have a user device 110, such as a mobile device. In one instance, the user may speak an utterance 104 that includes the user's name or a particular keyword. In another instance the user may speak an utterance 106 that indicates the user's presence. The utterance 104/106 may be received at a computing device 120, such as a shared device. The computing device 120, based on systems and processes described in more detail below, is able to determine and output the proper pronunciation of the user's name or another keyword or phrase associated with the user. For example, the user's name may be "Justen", which is pronounced like "Justine"—Juss-TEEN—and not like "Justin"—JUH-stin. The shared device 120 may determine the appropriate pronunciation from JUH-stin 122 and Juss-TEEN 124. Accordingly, the shared device 120 may respond to the utterance with a reply 130 that includes the proper pronunciation, Juss-TEEN.

In general, one implementation of the present disclosure allows users to be accurately associated with spoken utterances received at a device. One implementation of the present disclosure also allows the device to respond to the receipt of a spoken utterance by performing an appropriate action, such as providing an appropriate audio response.

For example, the device may provide an audio response which includes one or more words pronounced in a manner which is familiar to the user(s) that have been associated with the spoken utterance. This may have the result that the audio response is more recognizable and easier to understand for the user(s). There may be a particular benefit to users that have limited ability to understand speech, making it easier for such users to interact with the device. Additionally, or alternatively, the device may perform an action on behalf of the user(s) that have been associated with the spoken utterance, such as sending an email on behalf of a user's profile.

When the described implementations of the present disclosure are implemented in the device and/or another computing apparatus such as a server, the associations between spoken utterances and users are formed in a reliable and technically efficient manner.

For example, according to one implementation, the device and/or other computing apparatus may determine a set of user profiles which are specifically associated with the device and, upon receipt of a spoken utterance at the device, identify from the determined set of profiles at least one user profile as being associated with the spoken utterance. This identification may be based on a comparison of pronunciation attributes of the user profiles in the set of user profiles with attributes of the spoken utterance.

The initial determination of the set of user profiles specifically associated with the device can be carried out in various technical ways, as explained in this specification. The determination of the initial set of user profiles associated with the device may mean that the comparison of the spoken utterance with pronunciation attributes of user profiles is significantly less computationally expensive than if the initial set of user profiles had not been determined.

Implementation of the present disclosure may have the effect that actions performed by a device in response to the receipt of a spoken utterance are appropriate and not prone to error. Furthermore, associations between the spoken utterance and individual users are made in a manner which is efficient in terms of its use of both processing and memory components. This may allow a response to be provided in a timely manner, even when the device and/or other computing apparatus implementing the present disclosure has limited processing capabilities.

Referring to FIG. 1, a mechanism may be provided for attributing the particular pronunciation of a name to an individual with a linked account, in an audio environment that includes multiple individuals, based on various factors such as the historic interaction of the individual with the device, a proximity of the individual's mobile device, and account registration. In this manner, for example, user names are correctly pronounced by a shared device that acts, for example, as a voice assistant, audio interface, or the like. Implementations described herein solve the complex technical problem of correctly identifying the pronunciation of a particular person's name, and in some cases, identifying a specific account or user profile belonging to the individual based on audio queues. To do so, a mechanism is implemented in a computing device that attributes multiple user profiles with a specific device and then matches one of those multiple user profiles to a received audio signal. After matching the user profile to the audio signal, the system is capable of providing audio-based replies to the user with the proper pronunciation that is specified within the user profile or associated with the user. Thus, the system correctly responds and engages with users without mispronouncing their names.

One way that the user profiles may be attributed as being pertinent to the shared device is based on a stored list of user profiles that had previously used the device. These user profiles may have used the device directly, by logging-in to the device and committing actions, or indirectly, by interacting with the device via another device. Another way that the user profiles may be attributed to being pertinent to the shared device is based on device proximity. For example, one or more nearby devices may be detected and the user profiles associated with each of those nearby devices may then be associated with the shared device. When the shared device needs to reference a user in an audio response, the shared device may determine that the user is likely represented by one of the user profiles associated with the nearby devices. Any number of technologies may be implemented for determining device proximity, including but not limited to Wi-Fi, Bluetooth, sub-audible sounds, received audio level, GPS, or the like, or any combination thereof.

As an alternative to, or in addition to, the prior use and proximity described above for attributing the user profiles as being pertinent to the shared device, social connections may also be used. In this manner, potential users who do not have second devices in the same room as the shared device, and have not yet interacted with the shared device may be identified. For example, a set of such potential users may be generated from a collection of social connections associated with a user profile that has already been identified. That social connectivity may be based on user interactions, a social graph, or the like. In addition, the collection of social connections may be filtered to exclude those who are not nearby or not within a threshold distance of the shared device.

Once a set of candidate user profiles is identified, a collection of pronunciation attributes associated with each profile may be used as a candidate list of pronunciation attributes for recognizing individual user's names when they speak. For example, a comparison may be made between a specific pronunciation represented by one or more pronunciation attributes and the audio segment with the user's name. One technical advantage of the present disclosure is that by determining a list of candidate names or candidate pronunciation attributes for a name or speech recognition component of the system to use, the accuracy and speed of the audio parsing is significantly improved. Another technical advantage is that by determining the particular candidate user profiles from all the user profiles available, for example, the particular "John Smith", out of all the "John Smith's", that the user is referring to when the user states his name may be determined.

Figure 2:
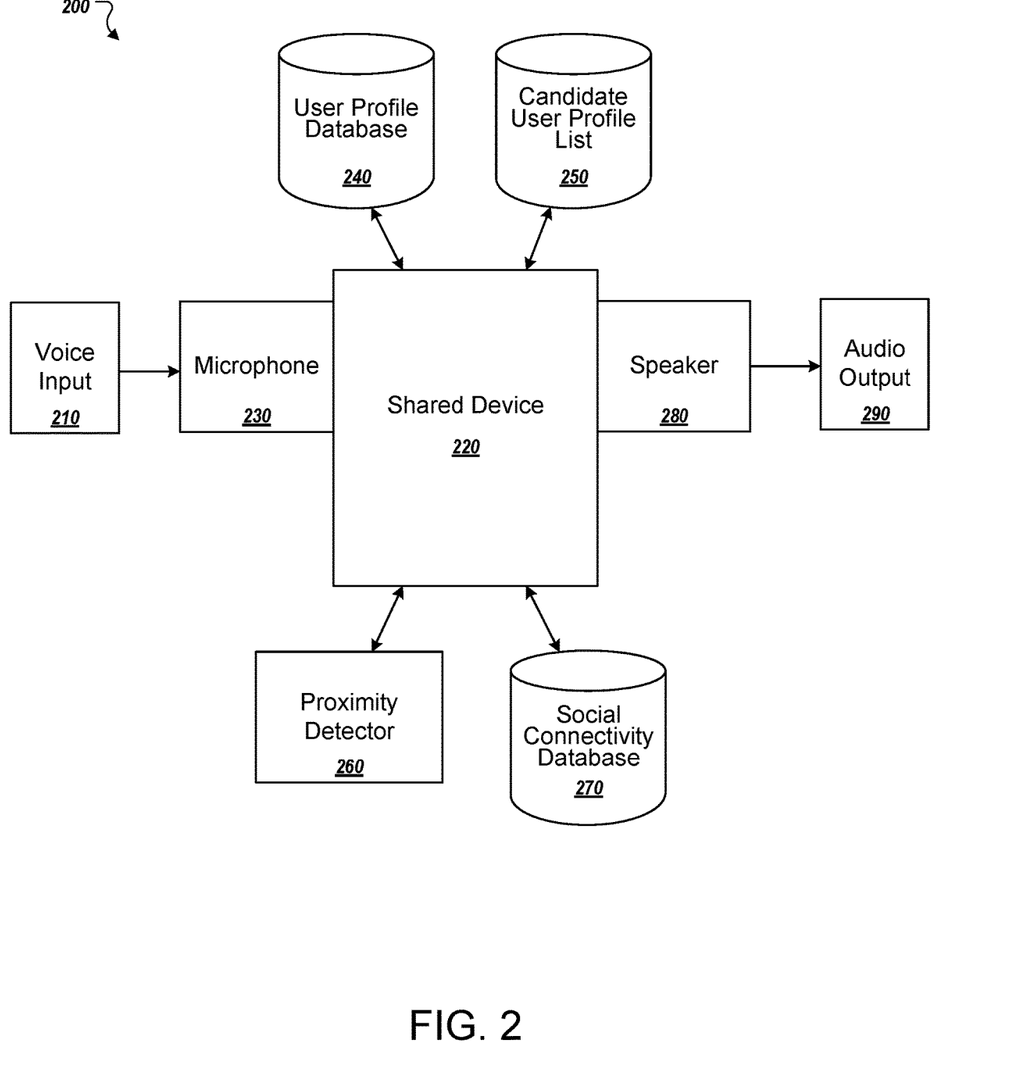
FIG. 2 depicts an example system for speech pronunciation attribution, according to certain implementations.

FIG. 2 depicts an example system 200 for speech pronunciation attribution. The system 200 may include a shared device 220, which may be a computing device with which multiple users may interact, either directly or indirectly. For example, the shared device 220 may include a microphone 230 for receiving audio and a speaker 280 for outputting audio. The microphone 230 may receive, for example, voice input 210 from a user or from another device. The shared device 220 may receive audio data corresponding to a spoken utterance as the voice input 210. A speech recognition component of the shared device 220 may analyze the received audio data corresponding to the spoken utterance as the voice input 210.

The shared device 220 may access a user profile database 240. The user profile database 240 may include a list of all registered users. The user profile database 240 may also store information associated with each of the users stored in the user profile database 240. For example, each user may have a user profile associated with the user that includes information about the user. One piece of information that may be included in the user profile is a pronunciation of the user's name or other word or phrase associated with the user. The stored pronunciation of the user's name may include pronunciation attributes. The system may set a canonical identifier that represents the pronunciation based on the pronunciation attributes and store the canonical identifier in association with the user.

The shared device 220 may include or access a candidate user profile list 250 stored in a storage medium. The candidate user profile list 250 may include the list of users that have been identified as associated with the shared device 220. The candidate user profile list 250 may include all of the user profile information described above as being stored in the user profile database 240. The candidate user profile list 250 may also include information relevant to the user's prior interaction with the shared device 220. As described above, each candidate user profile stored in the candidate user profile list 250 may be determined as being associated with the shared device 220 in a number of ways. For example, a record of whether the user profile has been logged-in to the shared device 220 or whether at least one user device associated with the user profile has communicated with the shared device 220 may be determined and stored. As other examples, which are described in more detail below, a geographical proximity of at least one user device associated with the user profile to the shared device may be determined, or a social connectivity may be determined based on at least one social connectivity metric. In addition, any combination of these mechanisms may be used to determine user profiles for the candidate user profile list 250 as being associated with the shared device 220.

The shared device 220 may include or access a proximity detector 260. The proximity detector 260 may determine a geographical proximity of a user or a device associated with a user in any of a number of ways. For example, the proximity detector 260 may use a Wi-Fi signal or connection, a Bluetooth signal or connection, or some other connectedness signal or connection, or any combination thereof, to determine the geographical proximity of a user or a device associated with a user to the shared device 220. As another example, the proximity detector 260 may use a GPS sensor or signal, or some other positioning sensor or signal, to determine the geographical proximity of a user or a device associated with a user to the shared device 220. As a further example, the proximity detector 260 may use sub-audible sound to determine the geographical proximity of a user or a device associated with a user to the shared device 220, for example by broadcasting or receiving a sub-audible token for determining proximity of other devices to the shared device 220. As yet another example, the proximity detector 260 may compare the relative audio strength of an audio signal received at nearby devices to determine the geographical proximity of a user or a device associated with a user to the shared device 220. For example, the device or multiple devices at which the strength of the received audio signal is the highest, indicating the user's voice is the loudest, is most likely to be associated with the user speaking the utterance and a user profile associated with that user or device may be identified.

The shared device 220 may access a social connectivity database 270. The social connectivity database 270 may include one or more social graphs, or prior user interactions, or the like. An affinity score may also be calculated and stored in the social connectivity database 270, indicating a strength of a relationship between respective users. As described above, the social connectivity data in the social connectivity database 270 may be used to determine candidate user profiles as associated with the shared device 220 even when those users are not near or have not previously interacted with the shared device 220. For example, all users with an affinity score that satisfies a predetermined threshold may be included as candidate user profiles in the candidate user profile list 250 associated with the shared device 220.

As described above, upon the shared device 220 receiving, at microphone 230, audio data corresponding to a spoken utterance as voice input 210, the shared device 220 may analyze the received audio data by comparing it to candidate pronunciation attributes determined from the candidate user profile list 250. A particular pronunciation attribute may be identified from the candidate pronunciation attributes based on the comparison, and the appropriate pronunciation using the particular pronunciation attribute may be provided in audio output 290 from speaker 280. The speaker 280 may be included with the shared device 220 or may be associated or connected with the shared device 220. Thus, the shared device 220 may respond to the voice input 210 with audio output 290 using the proper pronunciation specified by the identified particular pronunciation attribute.

Figure 3:
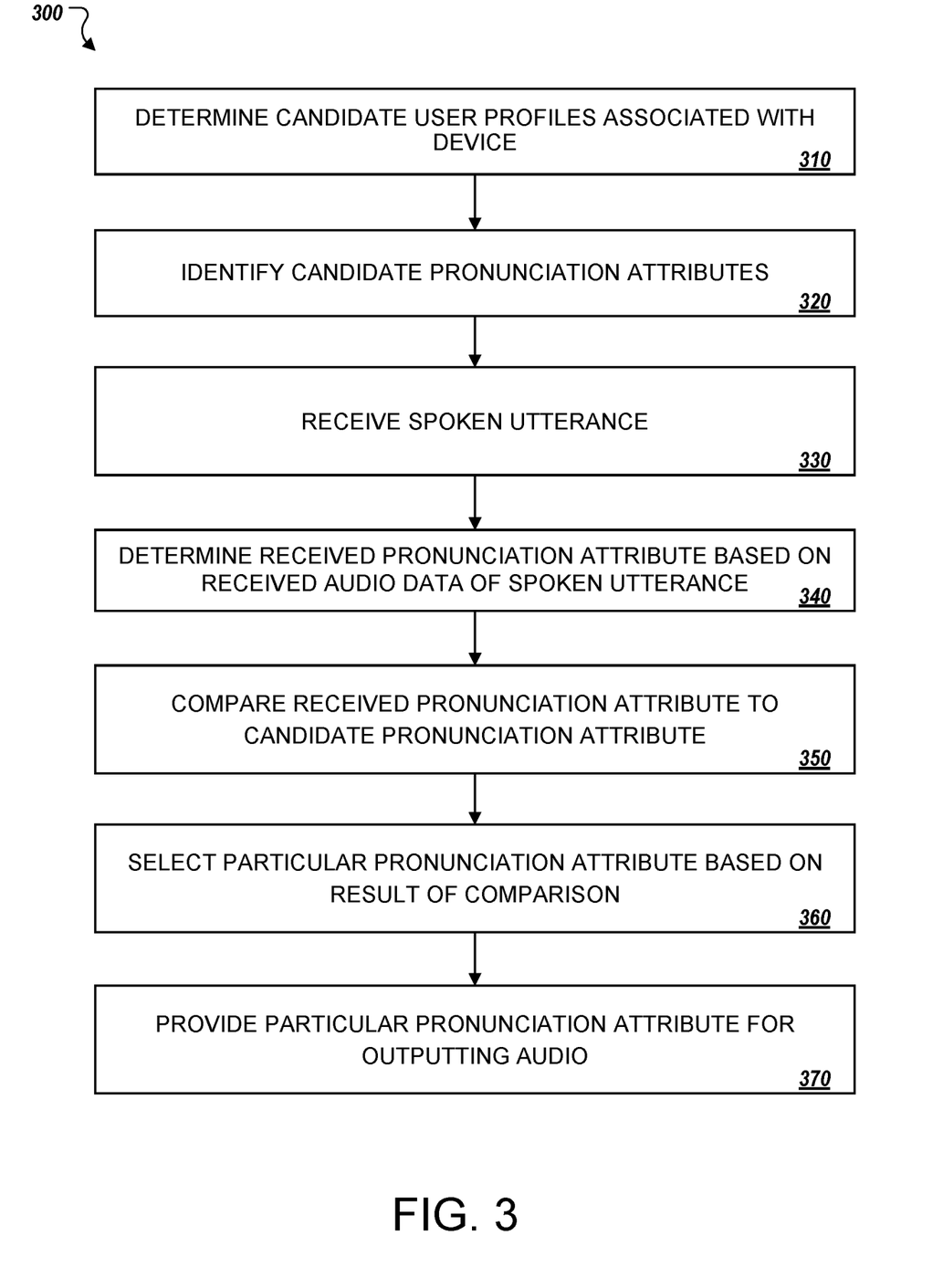
FIG. 3 depicts an example flowchart for a speech pronunciation attribution process, according to certain implementations.

FIG. 3 depicts an example flowchart for a speech pronunciation attribution process 300. The speech pronunciation attribution process 300 may include determining candidate user profiles as being associated with a shared device at 310. This determination of candidate user profiles as being associated with a shared device may include determining a relationship between each of multiple user profiles and the shared device, and determining, for each user profile, whether that relationship is indicative of an association between the user profile and the shared device. Then, for each user profile having a relationship indicative of an association with the shared device, the user profile may be identified as being one of the candidate user profiles associated with the shared device.

The process of determining whether the relationship between each of multiple user profiles and the shared device is indicative of an association between the user profile and the shared device may include, for example, determining whether the user profile has been logged-in to the shared device or whether at least one user device associated with the user profile has communicated with the shared device. The relationship between each of multiple user profiles and the shared device that is determined may include, for example, a geographical proximity of at least one user device associated with the user profile to the shared device. As another example, the relationship between each of multiple user profiles and the shared device that is determined may include a social connectivity, where the social connectivity is based on at least one social connectivity metric. For example, as described above, the social connectivity may be based on one or more social graphs, one or more interactions between users, or a calculated affinity score between users, or the like, or any combination thereof.

Referring to FIG. 3, at 320, the process may include identifying, from the candidate user profiles, candidate pronunciation attributes associated with at least one of the candidate user profiles determined to be associated with the shared device. For example, a candidate user profile may include one or more pronunciation attributes representing the pronunciation of a name, phrase, or other keyword. A candidate user profile may include a canonical identifier that represents the one or more pronunciation attributes associated with the candidate user profile. For example, a user's name may be parsed into a canonical form, which may be a description of the pronunciation of the name, based on the pronunciation attributes associated with the candidate user profile. Thus, candidate canonical identifiers may be identified that are associated with at least one of the candidate user profiles.

At 330, a spoken utterance may be received at the shared device. The spoken utterance may correspond to a user's name, a particular keyword, a particular phrase or command, or the like. The spoken utterance may be received, for example, at a microphone of the shared device or associated with the shared device. A received pronunciation attribute may be determined at 340, based on received audio data corresponding to the spoken utterance. For example, a speech recognition process may be invoked to determine the pronunciation attribute based on the received audio data that corresponds to the spoken utterance.

The received pronunciation attribute may be compared to at least one of the candidate pronunciation attributes at 350. For example, the received pronunciation attribute may be compared to a candidate pronunciation attribute to determine whether there is a likely match between the candidate pronunciation attribute and the received pronunciation attribute. The received pronunciation attribute may be compared to each of multiple candidate pronunciation attributes and a likelihood or probability of a match may be determined for the received pronunciation attribute with each of the multiple candidate pronunciation attributes.

At 360, a particular pronunciation attribute may be selected from the candidate pronunciation attributes based on a result of the comparison of the received pronunciation attribute to at least one of the candidate pronunciation attributes. For example, the particular pronunciation attribute may be selected based on identifying a match between the particular pronunciation attribute and the received pronunciation attribute. The particular pronunciation attribute may be selected, for example, based on identifying the most likely or highest probability of a match between one of the candidate pronunciation attributes and the received pronunciation attributes.

The particular pronunciation attribute, selected from the candidate pronunciation attributes, may be provided at 370, for outputting audio associated with the spoken utterance. For example, the shared device may generate a reply to the spoken utterance that includes the proper pronunciation of a name or word based on the particular pronunciation attribute. Thus, the process 300 may include providing an audio response to the spoken utterance, the audio response including the particular pronunciation selected from the candidate pronunciation attributes.

In some instances, the received audio data might be determined to be associated with multiple user profiles from the candidate user profiles. This may occur when multiple users share, for example, the same name or similar names. In these instances, the selected user profile may be corrected upon determining multiple user profiles by asking the user for or about another piece of identifying information, such as sur name, phone number, email address, or the like. This correction may only proceed when the user needs to be attributed with a specific action, for example, recording something specific to that user.

In other instances, if multiple user profiles are determined, when the exact user profile for a represented user is not immediately needed to perform a particular action, the same pronunciation may be used to appropriately address the user, i.e., regardless of which of the multiple users the user actually is, because the pronunciation is shared among the multiple users. In these instances, the system may store a state referencing the pronunciation attribute, e.g., example the pronounced version of the name, and the multiple candidate user profiles determined to be associated with the received audio data. The system may then refer to that stored state for interactions with the user. When the system encounters an event or action that requires an attribution to a specific user profile among the multiple user profiles, the system may proceed with the correction as described above, for example, requesting identifying information from the user to determine the particular user profile for the user who spoke the utterance.

According to this process, once the correct pronunciation is identified, even if it is associated with multiple user profiles, the user may be referenced by their name as an entity, but the user's actions may not be attributed to the user's account. In these instances, the system has a set of actions that it can engage in with the user that do not require a specific user profile, i.e., a pronounced name only state, and a second set of actions that require the specific user's profile, i.e., user-specific state. When the system is operating in the pronounced name only state and needs to engage in the user-specific state for an action requiring the specific user's profile, then the system may process an event requesting the user to provide user-specific information to specify which of the accounts is the user's.

In this manner, users may interact with the shared device more organically, delaying the need to request or obtain uniquely identifiable information from the user in order to proceed with an audio reply to the user. Thus, the shared device can not only distinguish which users are present or interacting with it, but can also reply and engage with the user using the correct pronunciation.

Figure 4:
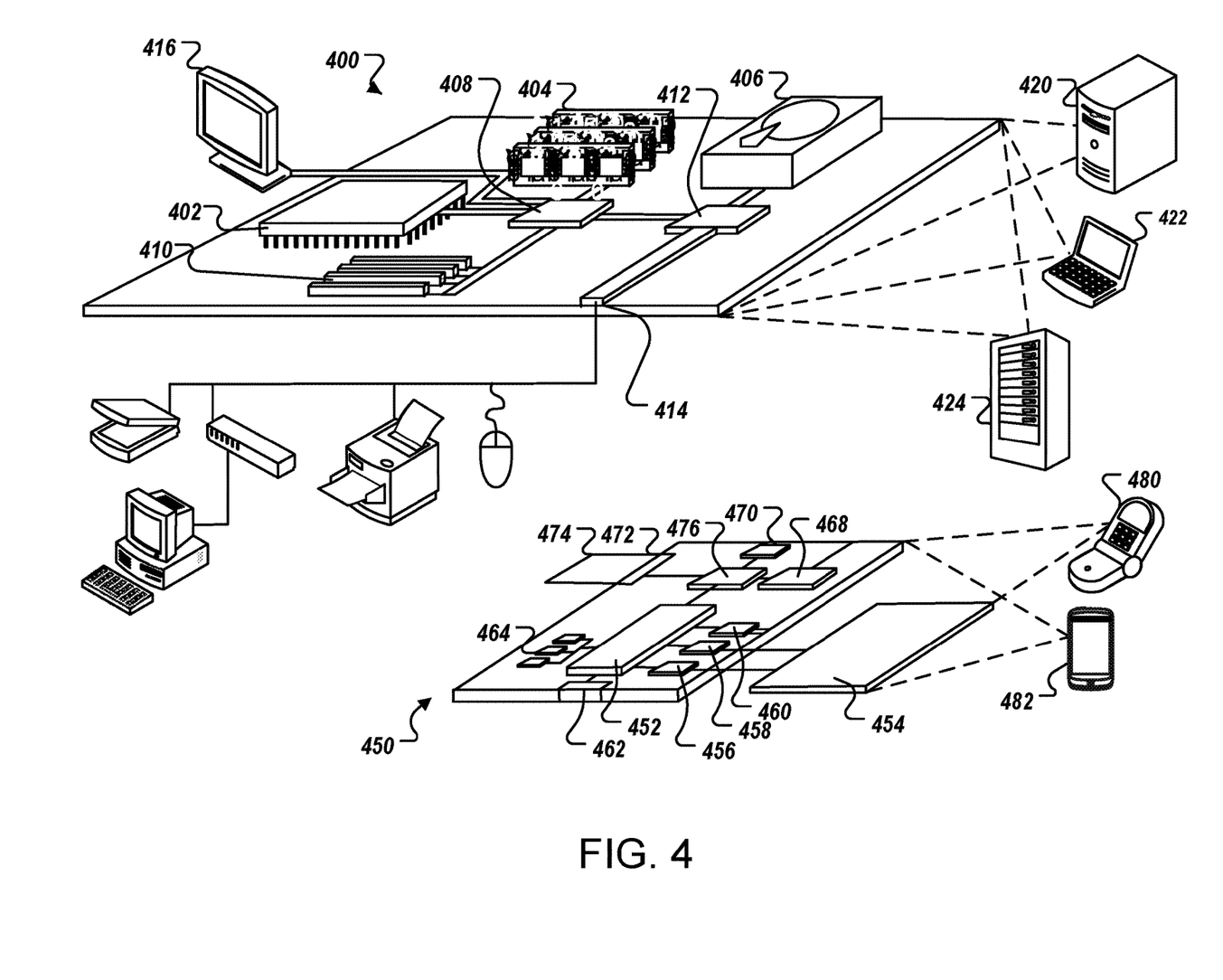
FIG. 4 depicts an example of a computing device and a mobile computing device that may be used to implement the techniques described here.

FIG. 4 depicts an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 648 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 454 may also be provided and connected to device 450 through expansion interface 452, which may include, for example, a SIMM (Single In Line Memory Module) card interface. Such expansion memory 454 may provide extra storage space for device 450, or may also store applications or other information for device 450. Specifically, expansion memory 454 may include instructions to carry out or supplement the processes described above, and may include secure information also. Thus, for example, expansion memory 454 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 454, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 450 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Implementations of the invention and all of the functional operations described in this specification can be implemented in digital electronic circuitry, or in computer software, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method implemented by one or more processors, the method comprising:
   receiving, at a shared digital assistant device, a spoken utterance of a user;
   determining that the spoken utterance matches a plurality of candidate user profiles;
   determining that the spoken utterance corresponds to a command associated with an action to be performed by an assistant of the shared digital assistant device;
   determining whether the action to be performed by the assistant must be attributed to a specific user profile; and
   when it is determined that the action to be performed by the assistant must be attributed to a specific user profile:
      selecting a particular user profile of the candidate user profiles, wherein selecting the particular user profile comprises:
         providing, at a user interface of the shared digital assistant device, a question related to identifying information;
         receiving, at the shared digital assistant device, user input responding to the question;
         comparing the user input responding to the question to corresponding identifying information for at least one of the plurality of candidate user profiles;
         identifying, based on the comparing, the particular user profile, of the plurality of candidate user profiles, as the specific user profile; and
      subsequent to identifying the particular user profile:
         attributing the action to the particular user profile;
         performing the action associated with the command corresponding to the spoken utterance of the user; and providing, at the user interface of the shared digital assistant device, first audio output related to the command, the action, or the attribution; and when it is determined that the action to be performed by the assistant need not be attributed to a specific user profile:

providing, at the user interface of the shared digital assistant device, second audio output related to the action or the command.

2. The method of claim 1, wherein each candidate user profile is associated with corresponding pronunciation attributes.

3. The method of claim 2, wherein the first audio output includes one or more of the corresponding pronunciation attributes associated with the particular user profile.

4. The method of claim 2, wherein the comparing further comprises comparing the user input responding to the question to the corresponding pronunciation attributes associated with at least one of the plurality of candidate user profiles.

5. The method of claim 2, wherein determining that the spoken utterance matches a plurality of candidate user profiles comprises:

determining one or more pronunciation attributes of the spoken utterance;

comparing the one or more pronunciation attributes of the spoken utterance to corresponding pronunciation attributes associated with a plurality of user profiles; and identifying, based on the comparing, the plurality of candidate user profiles of the plurality of user profiles.

6. The method of claim 1, wherein the identifying information includes a phone number.

7. A system comprising one or more computers and one or more storage devices storing instructions that are operable, when executed by the one or more computers, to cause the one or more computers to perform operations comprising:

receiving, at a shared digital assistant device, a spoken utterance of a user;

determining that the spoken utterance matches a plurality of candidate user profiles;

determining that the spoken utterance corresponds to a command associated with an action to be performed by an assistant of the shared digital assistant device;

determining whether the action to be performed by the assistant must be attributed to a specific user profile; and when it is determined that the action to be performed by the assistant must be attributed to a specific user profile:

selecting a particular user profile of the candidate user profiles, wherein selecting the particular user profile comprises:

providing, at a user interface of the shared digital assistant device, a question related to identifying information;

receiving, at the shared digital assistant device, user input responding to the question;

comparing the user input responding to the question to corresponding identifying information for at least one of the plurality of candidate user profiles;

identifying, based on the comparing, the particular user profile, of the plurality of candidate user profiles, as the specific user profile; and subsequent to identifying the particular user profile:

attributing the action to the particular user profile;

performing the action associated with the command corresponding to the spoken utterance of the user; and providing, at the user interface of the shared digital assistant device, first audio output related to the command, the action, or the attribution; and when it is determined that the action to be performed by the assistant need not be attributed to a specific user profile in a database:

providing, at the user interface of the shared digital assistant device, second audio output related to the command or the action.

8. The system of claim 7, wherein each candidate user profile is associated with corresponding pronunciation attributes.

9. The system of claim 8, wherein the first audio output includes one or more of the corresponding pronunciation attributes associated with the particular user profile.

10. The system of claim 8, wherein the comparing further comprises comparing the user input responding to the question to the corresponding pronunciation attributes associated with at least one of the plurality of candidate user profiles.

11. The system of claim 8, wherein determining that the spoken utterance matches a plurality of candidate user profiles comprises:

determining one or more pronunciation attributes of the spoken utterance;

comparing the one or more pronunciation attributes of the spoken utterance to corresponding pronunciation attributes associated with a plurality of user profiles; and identifying, based on the comparing, the plurality of candidate user profiles of the plurality of user profiles.

12. The system of claim 7, wherein the identifying information includes a phone number.

13. A computer-readable storage device storing instructions executable by one or more computers which, upon such execution, cause the one or more computers to perform operations comprising:

receiving, at a shared digital assistant device, a spoken utterance of a user;

determining that the spoken utterance matches a plurality of candidate user profiles;

determining that the spoken utterance corresponds to a command associated with an action to be performed by an assistant of the shared digital assistant device;

determining whether the action to be performed by the assistant must be attributed to a specific user profile; and when it is determined that the action to be performed by the assistant must be attributed to a specific user profile:

selecting a particular user profile of the candidate user profiles, wherein selecting the particular user profile comprises:

providing, at a user interface of the shared digital assistant device, a question related to identifying information;

receiving, at the shared digital assistant device, user input responding to the question;

comparing the user input responding to the question to corresponding identifying information for at least one of the plurality of candidate user profiles;

identifying, based on the comparing, the particular user profile, of the plurality of candidate user profiles, as the specific user profile; and subsequent to identifying the particular user profile:

attributing the action to the particular user profile;

performing the action associated with the command corresponding to the spoken utterance of the user; and providing, at the user interface of the shared digital assistant device, first audio output related to the command, the action, or the attribution; and when it is determined that the action to be performed by the assistant need not be attributed to a specific user profile in a database:

providing, at the user interface of the shared digital assistant device, second audio output related to the command or the action.

14. The computer-readable storage device of claim 13, wherein each candidate user profile is associated with corresponding pronunciation attributes.

15. The computer-readable storage device of claim 14, wherein the first audio output includes one or more of the corresponding pronunciation attributes associated with the particular user profile.

16. The computer-readable storage device of claim 14, wherein the comparing further comprises comparing the user input responding to the question to the corresponding pronunciation attributes associated with at least one of the plurality of candidate user profiles.

17. The computer-readable storage device of claim 14, wherein determining that the spoken utterance matches a plurality of candidate user profiles comprises:

determining one or more pronunciation attributes of the spoken utterance;

comparing the one or more pronunciation attributes of the spoken utterance to corresponding pronunciation attributes associated with a plurality of user profiles; and identifying, based on the comparing, the plurality of candidate user profiles of the plurality of user profiles.

18. The computer-readable storage device of claim 13, wherein the identifying information includes a phone number.

* * * * *